United States Patent
Dixon et al.

(10) Patent No.: US 7,356,371 B2
(45) Date of Patent: Apr. 8, 2008

(54) ADAPTIVE SENSOR MODEL

(75) Inventors: Roger Dixon, Littlethorpe (GB); Andrew W Pike, Countesthorpe (GB)

(73) Assignee: Alstom Technology Ltd, Baden (CH)

( * ) Notice: Subject to any disclaimer, the term of this patent is extended or adjusted under 35 U.S.C. 154(b) by 215 days.

(21) Appl. No.: 11/056,619

(22) Filed: Feb. 11, 2005

(65) Prior Publication Data

US 2006/0184255 A1    Aug. 17, 2006

(51) Int. Cl.
*G05B 13/02* (2006.01)
(52) U.S. Cl. ........................................... 700/28
(58) Field of Classification Search ................ 700/28, 700/29, 30, 31, 32, 21, 79, 108, 110, 143
See application file for complete search history.

(56) References Cited

U.S. PATENT DOCUMENTS

| | | | | |
|---|---|---|---|---|
| 4,358,822 A | * | 11/1982 | Sanchez | 700/31 |
| 4,578,747 A | | 3/1986 | Hideg et al. | |
| 4,639,853 A | | 1/1987 | Rake et al. | |
| 5,105,372 A | | 4/1992 | Provost et al. | |
| 5,311,562 A | * | 5/1994 | Palusamy et al. | 376/215 |
| 5,384,698 A | * | 1/1995 | Jelinek | 700/29 |
| 5,442,544 A | * | 8/1995 | Jelinek | 700/29 |
| 5,777,872 A | * | 7/1998 | He | 700/29 |
| 5,842,189 A | * | 11/1998 | Keeler et al. | 706/16 |
| 6,169,931 B1 | * | 1/2001 | Runnels | 700/97 |
| 6,539,783 B1 | * | 4/2003 | Adibhatla | 73/118.1 |
| 6,662,058 B1 | * | 12/2003 | Sanchez | 700/44 |
| 6,721,609 B1 | * | 4/2004 | Wojsznis et al. | 700/28 |
| 2002/0147506 A1 | * | 10/2002 | Eryurek et al. | 700/28 |
| 2003/0171728 A1 | | 9/2003 | Gustafsson et al. | |
| 2005/0131620 A1 | * | 6/2005 | Bowyer | 701/108 |
| 2005/0149209 A1 | * | 7/2005 | Wojsznis et al. | 700/30 |

FOREIGN PATENT DOCUMENTS

GB        2 404 999 A    2/2005

OTHER PUBLICATIONS

*A Directional Forgetting Factor for Single-Parameter Variations*, Proceedings of the American Control Conference (ACC), Seattle, Jun. 21, 1995, vol. 2, pp. 1149-1151.

* cited by examiner

*Primary Examiner*—Thomas K Pham
(74) *Attorney, Agent, or Firm*—Kirschstein, et al.

(57) ABSTRACT

The invention provides a method of predicting output values of a physical system from a set of measured inputs of the system using an adaptive model. At each time when a prediction is made, the model is re-initialized to an initial, off-line model and is then refined to incorporate on-line data using a predetermined number of recent sets of measured inputs and outputs. The model thus always remains "tethered" to the initial, off-line model and if operating conditions remain steady, the model does not become too specific to those operating conditions.

21 Claims, 1 Drawing Sheet

ADAPTIVE SENSOR MODEL

FIELD OF THE INVENTION

The invention relates to the field of modelling physical systems. One example is the modelling of gas turbine engines but the method is in principle applicable to any physical system where a set of measured inputs of the system can be used to predict an output of the system.

BACKGROUND OF THE INVENTION

It is often desirable to operate a model of a plant or system in real time to predict the output(s) of that system based on a set of measured inputs. The predicted output(s) can then be used to control the system in order to obtain the desired outputs.

In the case where the model was created and fitted to data off-line, it is usually beneficial to permit the model to be refined based on on-line measurements of the system output, in order for a generic model to be adapted to an individual system or to the particular operating conditions of the system.

Adaptive algorithms are known, which can refine a model of a system based on the measured inputs and outputs of the system while on-line. Such algorithms typically use methods based on recursive least squares to refine the model and it is known to tailor the way in which such models are refined using "forget factors" to determine how much effect the new data has on the model, and covariance matrices to incorporate estimated parameter uncertainty information into the adaptive parameter updates.

A significant problem of known real-time adaptive algorithms is that they may over-adapt the model to the current data. The longer the system runs at a steady operating point, the more data about that operating point accumulates and the more closely the model will be tuned to behaviour at that operating point. The consequence of over-adaptation is a model that gives accurate predictions of response around the current operating point but predicts badly when the operating point changes: i.e. the generality of the model is lost.

SUMMARY OF THE INVENTION

The invention provides a method of predicting output values $\hat{y}$ of a physical system from a set of measured inputs $r_j$ of the system, wherein at each time t when a prediction is made, the method comprises the following steps:
(a) storing the set of measured inputs $r_j(t_i)$ and the corresponding measured output $y(t_i)$ at each of a predetermined number n of times $t_1 \ldots t_n$ earlier than t;
(b) initializing a model of the system, which generates a predicted output $\hat{y}(t)$ from the set of measurements $r_j(t)$, to a predetermined initial model;
(c) using each of the predetermined number n of sets of measured inputs $r_j(t_i)$ and output $y(t_i)$ to adapt the model; and
(d) using the adapted model to predict the output value $\hat{y}(t)$ of the system at time t from the set of measured inputs $r_j(t)$ of the system at time t.

The invention thus differs from the prior art in that, when each prediction is made, the method starts with the initial (e.g. off-line) model and then revises the model using only the most recent n sets of on-line data. The model always remains "tethered" to the initial, generic model, while also taking into account recent data. If operating conditions remain steady, the model does not become too specific to those operating conditions. The number n can be chosen for any given system to achieve the desired balance between contributions from the initial model and from on-line measurements.

The physical system may be an engine, such as a gas turbine engine. The invention allows an initial model to be developed that is applicable to a whole group of systems, such as an engine fleet, whilst also being capable of adapting itself to be directly applicable to the individual engine on which it is installed The invention is applicable to the modelling of almost any physical system but specific examples of the predicted output value $\hat{y}(t)$ in the context of a turbine engine might be the compressor outlet pressure (units Pa) or the first stage turbine outlet temperature (units deg.K).

Preferably, the times $t_1 \ldots t_n$ are the most recent n times preceding time t at which measurements were made, so that the most current data are used to refine the model. However, there may be applications in which it is desirable to use a set of sampling times spread more widely over the lifetime of the system in order to base the revised model on a broader range of experience. In that situation, it is likely that the sampling times will not be evenly spread but clustered more closely in the recent past.

Preferably, step (c) of the method is applied using the n sets of measurements $r_j(t_i)$ and $y(t_i)$ in chronological order.

In a preferred method according to the invention, for each of the n sets of measurements of the inputs and the output, step (c) comprises the following steps:
(c1) applying the model to the set of inputs $r_j(t_i)$ to generate a predicted output $\hat{y}(t_i)$ at time $t_i$;
(c2) calculating an error $\epsilon(t_i)$ by finding the difference between the predicted output $\hat{y}(t_i)$ and the measured output $y(t_i)$ at time $t_i$; and
(c3) using the error $\epsilon(t_i)$ to revise a set of parameters $b_k$ of the model.

Step (c3) of the method may use a recursive estimation algorithm to revise the parameters $b_k$ of the model. This is preferably a Recursive Least Squares (RLS) algorithm but other established recursive parameter estimation methods could be applied, for example Recursive Maximum Likelihood (RML), Recursive Instrumental Variables (RIV) etc.

The model may further include an error covariance matrix P, which is used in step (c3) to revise the parameters of the model; in which case the method further comprises a step (c4) of using the measured input values $r_j(t_i)$ to revise the error covariance matrix P. It is within this error covariance matrix that the information about all the previous data and the model's fit to that data is encoded.

The invention may alternatively be expressed as a method for real-time prediction of the value of an output variable of a physical system from knowledge of the values of a plurality of input variables of the system, comprising the steps of:
storing off-line data comprising a generic set of n values of each of the input and output variables,
periodically sampling, with a periodicity of t, on-line data comprising the values of the input variables and the value of the output variable,
storing a set of m successive samples of the on-line data,
updating the stored on-line data at each sample period t by adding recently sampled values of input and output variables and discarding the oldest sampled values of input and output variables,
initializing a model of the physical system at the beginning of each sample period t using the off-line data, revising the model after each initialization using the updated stored on-line data, and using the revised model to predict a value of the output variable.

It will be understood by the person skilled in the art that the number n should preferably be much greater than the number m.

The invention further provides a control apparatus for a physical system, the apparatus including a mathematical model of the physical system for predicting the value of an output variable of the system from measured values of input variables of the system in accordance with a method as previously defined.

In another aspect, the invention provides a closed loop control system for a plant such as a gas turbine engine that has sensors installed therein for on-line measurement of plant behaviour by periodic sampling of on-line sensor output signals by the control system, the control system comprising:

a control function, at least one adaptive sensor model derived from both off-line and on-line measurements of plant behaviour, the model comprising a first algorithm for deriving for output from the model a synthetic sensor signal corresponding to one of the sensor output signals, and selection logic for selecting for input to the control function the synthetic sensor signal and the on-line sensor output signals.

The selection logic may be operative to run a second algorithm that compares the on-fine sensor signals and the synthetic sensor signal with a weighted average of their values, thereby to select a signal most likely to accurately represent engine behaviour.

The control system may comprise a plurality of adaptive sensor models, each such model being operative to derive a synthetic sensor signal corresponding to a respective one of the on-line sensor signals.

It is envisaged that the first algorithm will implement a method as previously defined.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Initially a fixed parameter model is fitted off-line to input/output data from an item of plant. The nature of these inputs and outputs will depend on the individual plant. For example, the plant may be a gas turbine engine. One model for a gas turbine engine may predict the compressor outlet pressure as a function of the following measured inputs: generated power, turbine exit pressure, compressor outlet temperature and shaft speed. Another model may predict the first stage turbine outlet temperature as a function of the following measured inputs: compressor outlet pressure, water injection flow and engine speed. In principle, similar models can be used to predict any variable of interest such as pressure temperature, speed or power, based on other measurements from around the engine; and of course such models are not limited to the field of engines.

After development of the initial, off-line model, the model algorithm is run in software as part of the control system for the plant. At each sample time of the control system, the model uses the measured plant inputs to predict the plant output. In addition, the model is updated at each sample time based on the measured output data received from the plant. That is, it is tuned to be a better representation of the input/output relationship. Hence, it is termed an adaptive sensor model.

Figure 1:
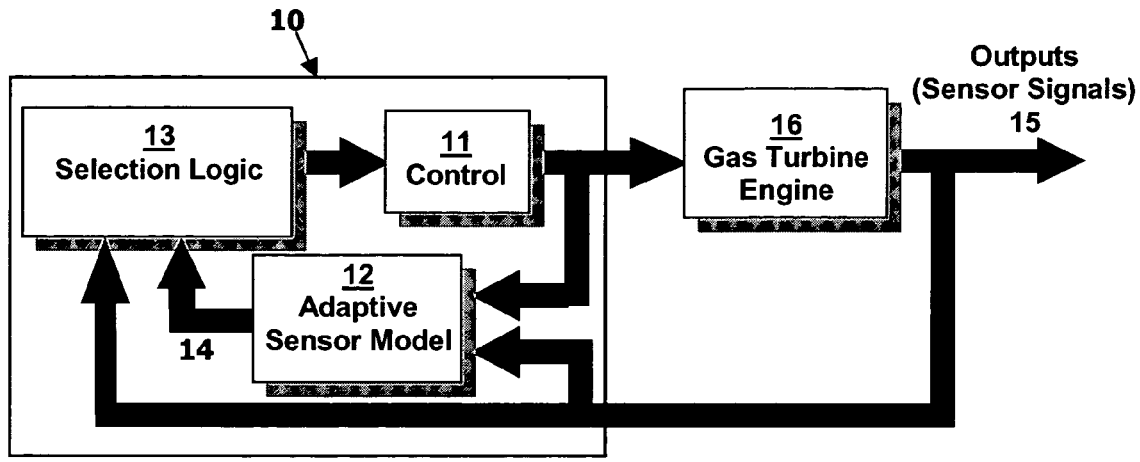
FIG. 1 diagrammatically illustrates a control system incorporating the invention.

Referring now to FIG. 1, a closed loop control system 10 is implemented digitally and comprises a control function 11, an adaptive sensor model 12 and selection logic 13, which selects for input to the control function 11 the output 14 of the model 12 and the on-line output signals 15 of various sensors installed in a gas turbine engine 16. The sensors are installed to enable on-line measurement of plant behaviour and their output signals are periodically sampled by the control system. As described herein, the adaptive sensor model 12 is derived from both off-line and on-line measurements of gas turbine behaviour (these being variables such as pressure, temperature, flow and rotor speed, as measured by the sensors in the gas turbine engine) and provides an additional "synthetic" sensor signal channel for input to the control function 11, if selected by the selection logic 13. The synthetic sensor signal 14 corresponds to a chosen one of the on-line sensor output signals 15. Hence, the adaptive sensor model 12 is an integral part of the overall closed loop control of the gas turbine 16.

It will be understood that more than one adaptive sensor model 12 may be incorporated in the control system 10 if it is desired to produce more than one synthetic sensor signal to predict the behaviour of more than one output of the gas turbine engine 16. For example, as previously stated, there may be one model for predicting compressor outlet pressure and another model for predicting first stsge turbine outlet tempertature.

The selection logic 13 implements a further algorithm that compares the outputs 15 of the sensors on the gas turbine and the output(s) 14 of the adaptive sensor model(s) with a weighted average of their values, the object being to select the signal(s) for input to the control function 11 that are most likely to accurately represent true values. This type of algorithm is well-known in the control system art and is used here to screen out signals from the control loop which may result from faulty sensors.

The benefits arising from incorporation of the adaptive sensor model(s) 12 in the control system 10 include:

improved ability to detect sensor faults; and improved ability to accommodate faults, because it allows continued controlled operation even after failure or signal biasing malfunction of one or more sensors in the gas turbine engine control loop. E.g. (1), the invention could enable the gas turbine engine to continue to operate normally at either full or part load, in response to the demands of the control function 11, but with the biased or faulty sensor signal(s) screened out. E.g. (2), alternatively, if the number and severity of the sensor faults exceeded predetermined critical limits, the invention could enable the gas turbine engine to be closed down in a controlled manner rather than it being subjected to an emergency shutdown.

Figure 2:
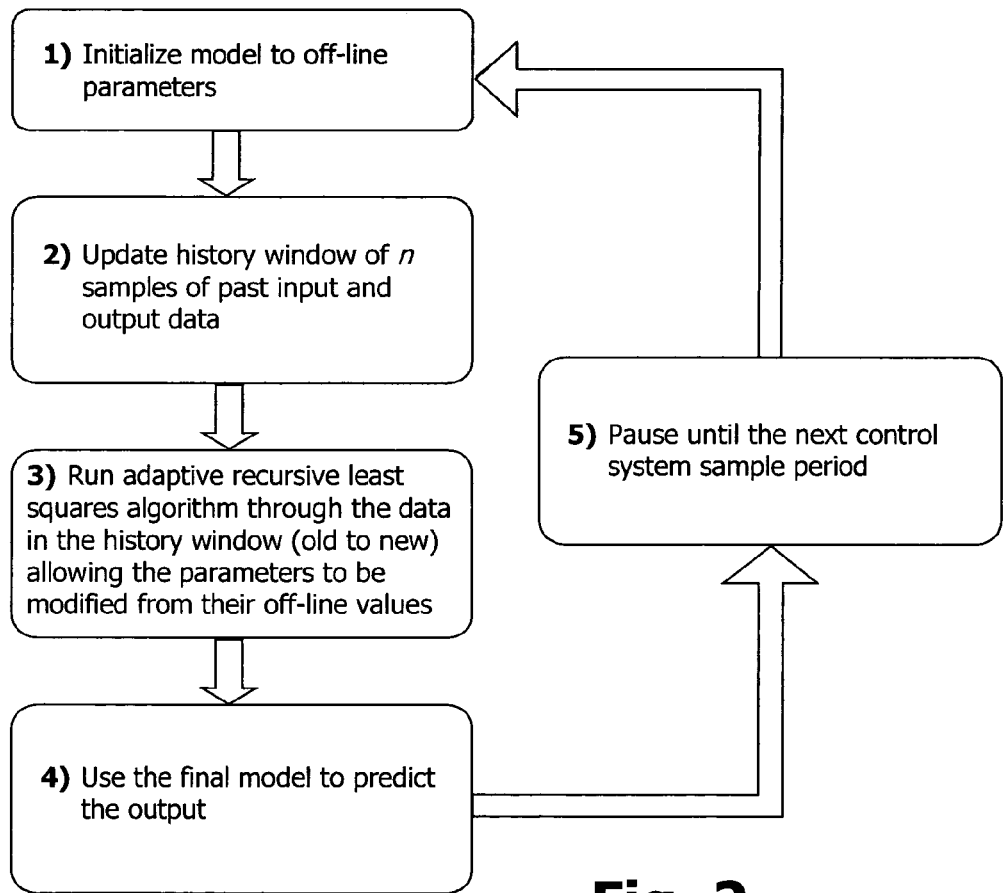
FIG. 2 is a flowchart showing the cycle of steps that is followed each time a prediction is made in accordance with the invention.

FIG. 2 gives an overview of the method implemented by the algorithm comprising the (or each) adaptive sensor model 12 and shows a cycle of steps that is followed once for each sample interval of the control system. In Step 1, the model is re-initialized to the off-line model. In particular, the model parameters and an error covariance matrix are initialized to the values obtained from the off-line fitting. It is important to note that this is done at every sample interval, whereby the adapted model always remains tethered to the initial model and the on-line data do not accumulate disproportionately.

Next, in Step 2, a window of n previous samples of input/output data is updated by adding the most recent set of values and deleting the oldest set of values.

In Step 3, the model adaptation takes place, using the recursive least squares (RLS) method. Alternatively, other established recursive parameter estimation methods could be applied, for example Recursive Maximum Likelihood (RML), Recursive Instrumental Variables (RIV) etc. The recursion begins with the oldest set of sampled input values and sweeps through the n samples in the window of historical data in sequence from old to new, updating the model parameters and the error covariance matrix each time to refine the model.

After n recursions of the adaptive algorithm, the final parameters of the adapted model are used in Step 4 to predict the current output based on the measured current inputs.

Step 5 represents a pause until the next sample interval, when the model is re-initialized and the cycle begins again from Step 1.

These steps are described in more detail below in relation to the particular model implementing the RLS parameter estimation method.

Model Structure

The structure of one particular model used for gas turbine engine sensor to sensor modelling is of the form:

$$\hat{y}(t) = \hat{b}_0(t) + \hat{b}_{11}(t)r_1(t) + \hat{b}_{21}(t)r_2(t) + \quad (1)$$
$$\ldots + \hat{b}_{NR1}(t)r_{NR}(t) + \hat{b}_{12}(t)r_1^2(t) + \hat{b}_{22}(t)r_2^2(t) + \ldots +$$
$$\hat{b}_{NR2}(t)r_{NR}^2(t) + \hat{b}_{13}(t)r_1^3(t) + \hat{b}_{23}(t)r_2^3(t) + \ldots + \hat{b}_{NR3}(t)r_{NR}^3(t)$$

Some of the coefficients $\hat{b}_{xx}(t)$ in (1) may be set to zero according to the module parameter 'order', discussed below. However, every model contains the term $\hat{b}_0(t)$.

Equation (1) can be written as follows:

$$\hat{y}(t) = [\hat{b}_0(t)\ \hat{b}_{11}(t)\ \ldots\ \hat{b}_{NR3}(t)] * \begin{bmatrix} 1 \\ r_1(t) \\ \vdots \\ r_{NR}^3(t) \end{bmatrix} = \hat{\theta}^T * \omega(t) \quad (2)$$

Nomenclature t—Index of current sample interval
t*—Index of one of the sample intervals in the history window (t−NH<t*<=t)
y(t)—Current measured value of response variable (output) {scalar}
r(t)—Current measured value of model regressors (inputs) {vector NR*1}
ŷ(t)—Current model predicted output {scalar}
θ̂(t)—Current model parameters {vector NTH*1}
NTH—number of model parameters ($\hat{b}_0, \hat{b}_{11}, \ldots \hat{b}_{NLR3}$)
NR—number of model regressors ($r_1, r_2, \ldots r_{NR}$)

NH—number of samples in the data memory (also referred to as n)
θ₀—initial model parameter values {vector NTH*1}
P₀—initial model parameter confidence {matrix NTH*NTH}
λ—RLS forget factor (0<λ<=1), default value 1
order—model structure identifier; {Binary vector 1*3NR}
  1 indicates term included, 0 indicates term not included. For example, with reference to equation (1) above, if NR=4 and order=[1111 1001 1011] then $$\hat{y}(t) = \hat{b}_0(t) + \hat{b}_{11}(t)r_1(t) + \hat{b}_{21}(t)r_2(t) + \hat{b}_{31}(t)r_3(t) + \hat{b}_{41}(t)r_4(t) +$$
$$\hat{b}_{12}(t)r_1^2(t) + \hat{b}_{42}(t)r_4^2(t) + \hat{b}_{13}(t)r_1^3(t) + \hat{b}_{33}(t)r_3^3(t) + \hat{b}_{43}(t)r_4^3(t)$$

Algorithm

Step 1) RLS initialisation:
  1.1) Set t*=t−NH
  1.2) Set θ̂(t*)=θ₀
  1.3) Set P(t*)=P₀

Step 2) Update data memory by adding most recent measurements r(t), y(t) and discarding oldest measurements y(t−NH), r(t−NH)

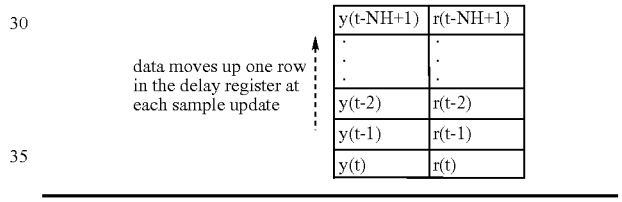

Step 3) RLS recursion:
  3.1) Update recursion time index:
    t*=t*+1
  3.2) Compute adaptation gain $$\mu(t^*) = \frac{P(t^*-1)\tilde{\omega}(t^*)}{\lambda + \tilde{\omega}^T(t^*)P(t^*-1)\tilde{\omega}(t^*)}$$

where $\tilde{\omega}(t^*)$ represents the reduced terms vector ω(t), defined in equation (2) above. In the reduced terms vector, the elements for which the corresponding element in the binary vector order are equal to 0 have been removed.

μ(t*) is an {NTH*1} vector 3.3) Compute model error $$\epsilon(t^*) = y(t^*) - \tilde{\omega}^T(t^*)\hat{\theta}(t^*-1)$$

3.4) Update model parameters $$\hat{\theta}(t^*) = \hat{\theta}(t^*-1) + \mu(t^*)\epsilon(t^*)$$

3.5) Update the error covariance matrix $$P(t^*) = \frac{1}{\lambda}\left[P(t^*-1) - \frac{P(t^*-1)\tilde{\omega}(t^*)\tilde{\omega}^T(t^*)P(t^*-1)}{\lambda + \tilde{\omega}^T(t^*)P(t^*-1)\tilde{\omega}(t)}\right]$$

3.6) IF (t*<t) Return to Step 3.1
ELSE go to Step 4.

Step 4) Update and output model prediction $$\hat{y}(t) = \hat{\theta}^T(t)$$

Step 5) Wait for next sample interval before returning to Step 1.

We claim:

1. A method of predicting output values $\hat{y}$ of a physical system from stored on-line data comprising a set of measured inputs $r_j$ of the system, wherein at each time t when a prediction is made, the method comprises the following steps:
   (a) updating the stored on-line data by storing the set of measured inputs $r_j(t_i)$ and the corresponding measured output $y(t_i)$ at each of a predetermined number n of times $t_1 \ldots t_n$ earlier than t;
   (b) initializing a model of the system, which generates a predicted output $\hat{y}(t)$ from the set of measurements $r_j(t)$, to a predetermined initial model using off-line data;
   (c) using each of the predetermined number n of sets of measured inputs $r_j(t_i)$ and output $y(t_i)$ to revise the model; and
   (d) using the revised model to predict the output value $\hat{y}(t)$ of the system at time t from the set of measured inputs $r_j(t)$ of the system at time t.

2. A method according to claim 1, wherein step (c) uses the n sets of measurements $r_j(t_i)$ and $y(t_i)$ in chronological order.

3. A method according to claim 1, wherein the times $t_1 \ldots t_n$ are the most recent n times preceding time t at which measurements were made.

4. A method according to claim 1, wherein, for each of the n sets of measurements of the inputs and the output, step (c) comprises the following steps:
   (c1) applying the model to the set of inputs $r_j(t_i)$ to generate a predicted output $\hat{y}(t_i)$ at time $t_i$;
   (c2) calculating an error $\epsilon(t_i)$ by finding the difference between the predicted output $\hat{y}(t_i)$ and the measured output $y(t_i)$ at time $t_i$; and
   (c3) using the error $\epsilon(t_i)$ to revise a set of parameters $b_k$ of the model.

5. A method according to claim 4, wherein step (c3) uses a recursive estimation algorithm to revise the parameters $b_k$ of the model.

6. A method according to claim 5, wherein step (c3) uses a recursive least squares algorithm to revise the parameters $b_k$ of the model.

7. A method according to claim 5, wherein the model further includes an error covariance matrix P, which is used in step (c3) to revise the parameters of the model; and wherein the method further comprises a step (c4) of using the measured input values $r_j(t_i)$ to revise the error covariance matrix P.

8. A method according to claim 7, wherein in step (c4) the error covariance matrix P is revised using the measurements from time $t_i$ according to the following formula:

$$P(t_i) = \frac{1}{\lambda} \left[ P(t_{i-1}) - \frac{P(t_{i-1})\tilde{\omega}(t_i)\tilde{\omega}^T(t_i)P(t_{i-1})}{\lambda + \tilde{\omega}^T(t_i)P(t_{i-1})\tilde{\omega}(t_i)} \right]$$

where:
   $P(t_i)$ is the revised error covariance matrix based on the measured input values up to time $t_i$;
   $P(t_{i-1})$ is the previous error covariance matrix based on the measured input values up to time $t_{i-1}$;
   $\tilde{\omega}(t_i)$ is a vector representing the set of measured input values $r_j(t_i)$ at time $t_i$ and powers of those input values $\{r_j(t_i)\}^n$ that are used in the model; and
   $\lambda$ is a scalar "forget factor" in the range $0 < \lambda < 1$.

9. A method according to claim 8, wherein:
   in step (c2) the scalar error $\epsilon(t_i)$ is calculated in accordance with the following formula:

$$\epsilon(t_i) = y(t_i) - \hat{\theta}^T(t_{i-1})\tilde{\omega}(t_i)$$

where $\hat{\theta}$ is a vector representing the set of model parameters $b_k$;
   and in step (c3) the parameters of the model are revised in accordance with the following formula:

$$\hat{\theta}(t_i) = \hat{\theta}(t_i)\epsilon(t_i)$$

where $\mu$ is a vector calculated from the following formula:

$$\mu(t_i) = \frac{P(t_{i-1})\tilde{\omega}(t_i)}{\lambda + \tilde{\omega}^T(t_i)P(t_{i-1})\tilde{\omega}(t_i)}.$$

10. A method according to claim 1, wherein the physical system is an item of plant.

11. A method according to claim 1, wherein the physical system is a gas turbine engine.

12. A method for real-time prediction of the value of an output variable of a physical system from knowledge of the values of a plurality of input variables of the system, comprising the steps of:
   storing off-line data comprising a generic set of n values of each of the input and output variables,
   periodically sampling, with a periodicity of t, on-line data comprising the values of the input and output variables,
   storing a set of m successive samples of the on-line data,
   updating the stored on-line data at each sample period by adding recently sampled values of input and output variables and discarding the oldest sampled values of input and output variables,
   initializing a model of the physical system at the beginning of each sample period t using the off-line data,
   revising the model after each initialization using the updated stored on-line data, and
   using the revised model to predict a value of the output variable.

13. A method according to claim 12, in which the number n is much greater than the number m.

14. A method according to claim 12, wherein the physical system is an item of plant.

15. A method according to claim 12, wherein the physical system is a gas turbine engine.

16. Control apparatus for a physical system, the apparatus including a mathematical model of the physical system for predicting the value of an output variable of the system from measured values of input variables of the system in accordance with a method as defined in claim 1 or claim 12.

17. A closed loop control system for an item of plant such as a gas turbine engine that has sensors installed therein for on-line measurement of plant behaviour by periodic sampling of on-line sensor signals by the control system, the on-line measurements being updated and stored at each sample period, the control system comprising:
   a control function,
   at least one adaptive sensor model derived from both off-line and on-line measurements of plant behaviour, the model comprising a first algorithm operative at each sample period to initialize the model using the off-line measurements, revise the initialized model using the updated stored on-line measurements, and derive for output from the model a synthetic sensor signal corresponding to one of the on-line sensor signals, and selection logic, for selecting for input to the control function the synthetic sensor signal and the on-line sensor signals.

18. A closed loop control system according to claim 17, wherein the selection logic implements a second algorithm that compares the on-line sensor signals and the synthetic sensor signal with a weighted average of their values, thereby to select a signal most likely to accurately represent engine behaviour.

19. A closed loop control system according to claim 17, comprising a plurality of adaptive sensor models, each such model being operative to derive a synthetic sensor signal corresponding to a respective one of the on-line sensor signals.

20. A closed loop control system according to claim 17, wherein the first algorithm implements a method of predicting output values $\hat{y}$ of the plant from a set of measured inputs $r_j$ of the plant, wherein at each time t when a prediction is made, the method comprises the following steps:

(a) storing the set of measured inputs $r_j(t_i)$ and the corresponding measured output $y(t_i)$ at each of a predetermined number n of times $t_1 \ldots t_n$ earlier than t;

(b) initializing the model of the plant, which generates a predicted output $\hat{y}(t)$ from the set of measurements $r_j(t)$, to a predetermined initial model;

(c) using each of the predetermined number n of sets of measured inputs $r_j(t_i)$ and output $y(t_i)$ to revise the model; and (d) using the revised model to output a predicted value $\hat{y}(t)$ of the plant at time t from the set of measured inputs $r_j(t)$ of the plant at time t, the predicted value $\hat{y}(t)$ being the synthetic sensor signal.

21. A closed loop control system according to claim 17, wherein the first algorithm implements a method for real-time prediction of the value of an output variable of the plant from knowledge of the values of a plurality of input variables of the plant, comprising the steps of:

storing off-line data comprising a generic set of n values of each of the input and output variables, periodically sampling, with a periodicity of t, on-line data comprising the values of the input and output variables, storing a set of m successive samples of the on-line data, updating the stored on-line data at each sample period t by adding recently sampled values of input and output variables and discarding the oldest sampled values of input and output variables, initializing a model of the plant at the beginning of each sample period t using the off-line data, revising the model after each initialization using the updated stored on-line data, and using the revised model to predict a value of the output variable, the predicted value being the synthetic sensor signal.

* * * * *